(12) United States Patent
Yin et al.

(10) Patent No.: US 9,632,877 B1
(45) Date of Patent: Apr. 25, 2017

(54) RESTORING A DATABASE TO MANAGED STORAGE FROM A PROXY BACKUP IMAGE

(71) Applicant: Veritas Technologies LLC, Mountain View, CA (US)

(72) Inventors: Zhuhua Yin, Beijing (CN); Weibao Wu, Vadnais Heights, MN (US); Yongguo Yan, Beijing (CN)

(73) Assignee: Veritas Technologies LLC, Mountain View, CA (US)

( * ) Notice: Subject to any disclaimer, the term of this patent is extended or adjusted under 35 U.S.C. 154(b) by 500 days.

(21) Appl. No.: 13/892,449

(22) Filed: May 13, 2013

(51) Int. Cl.
  *G06F 17/30* (2006.01)
  *G06F 11/14* (2006.01)
(52) U.S. Cl.
  CPC .............................. *G06F 11/1469* (2013.01)
(58) Field of Classification Search
  CPC ......... G06F 17/30067; G06F 17/30082; G06F 17/30235; G06F 11/1469
  See application file for complete search history.

(56) References Cited

U.S. PATENT DOCUMENTS

| | | | | |
|---|---|---|---|---|
| 6,026,414 A * | 2/2000 | Anglin | ................. | G06F 11/1456 |
| 7,069,401 B1 * | 6/2006 | Noonan | ............... | G06F 11/1461 |
| | | | | 707/999.202 |
| 7,370,164 B1 * | 5/2008 | Nagarkar | ............ | G06F 11/1451 |
| | | | | 707/999.202 |
| 8,719,286 B1 * | 5/2014 | Xing | .................... | G06F 11/1451 |
| | | | | 707/755 |
| 8,843,450 B1 * | 9/2014 | Shioyama | ......... | G06F 17/30235 |
| | | | | 707/650 |
| 2004/0250033 A1 * | 12/2004 | Prahlad | ............... | G06F 11/1451 |
| | | | | 711/162 |
| 2010/0262645 A1 * | 10/2010 | Brown | ..................... | G06F 21/10 |
| | | | | 709/203 |
| 2011/0047340 A1 * | 2/2011 | Olson | ................. | G06F 11/1456 |
| | | | | 711/162 |
| 2011/0087874 A1 * | 4/2011 | Timashev | ........... | G06F 9/44589 |
| | | | | 713/100 |
| 2011/0107331 A1 * | 5/2011 | Evans | ................. | G06F 9/45541 |
| | | | | 718/1 |
| 2013/0262638 A1 * | 10/2013 | Kumarasamy | ........ | G06F 9/4856 |
| | | | | 709/221 |

* cited by examiner

*Primary Examiner* — Shiow-Jy Fan
(74) *Attorney, Agent, or Firm* — Campbell Stephenson LLP

(57) ABSTRACT

The present disclosure describes implementing a virtual image file system, or IMGFS. A mount point directory is created in a local file system, where the local file system organizes files on a storage device. The mount point directory corresponds to a proxy backup image file stored on the storage device. The proxy backup image file stores an image file system. The image file system is mounted on the local file system at the mount point directory, using a virtual file system that implements an interface configured to access the image file system. In some embodiments, a notification is provided to a recovery manager that indicates the recovery manager should catalog one or more database files of the proxy backup image file. One or more database files can be restored to a second storage device, such as a group of physical disks that are managed as a single storage unit.

18 Claims, 10 Drawing Sheets

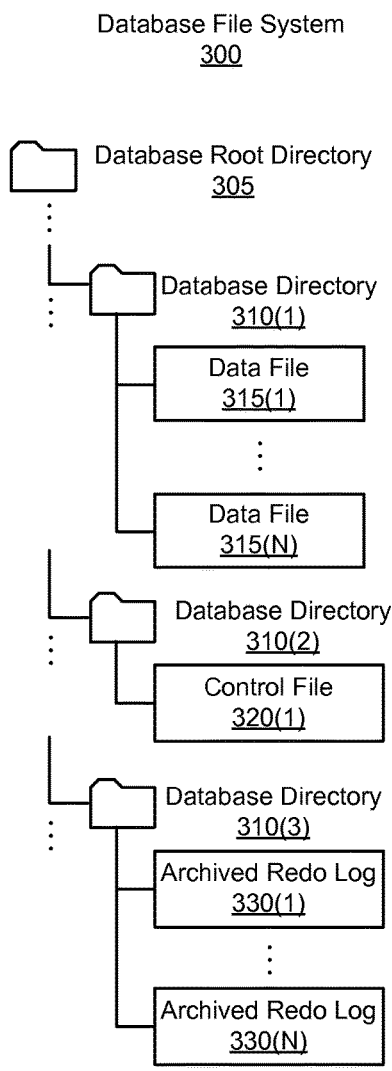
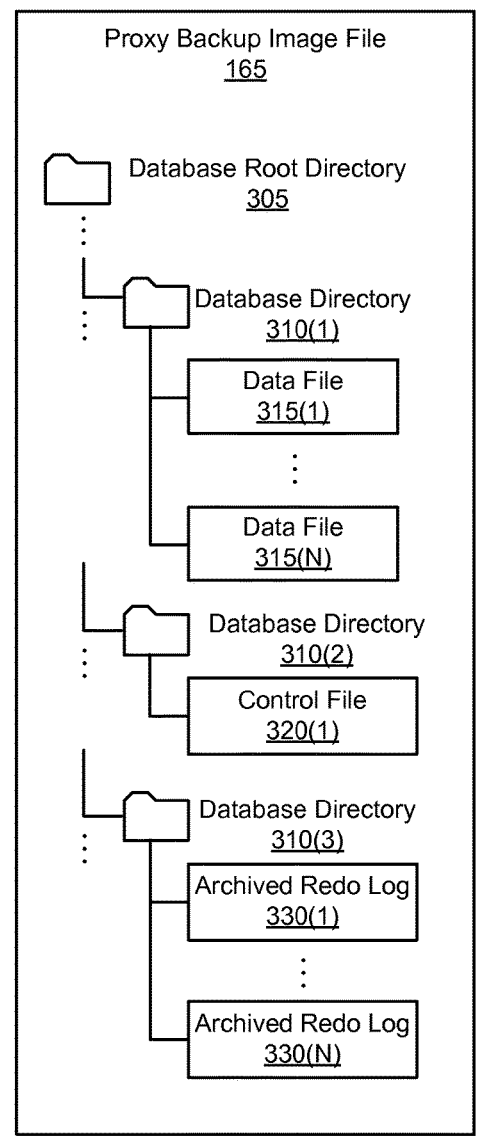
*Fig. 3A*  *Fig. 3B*

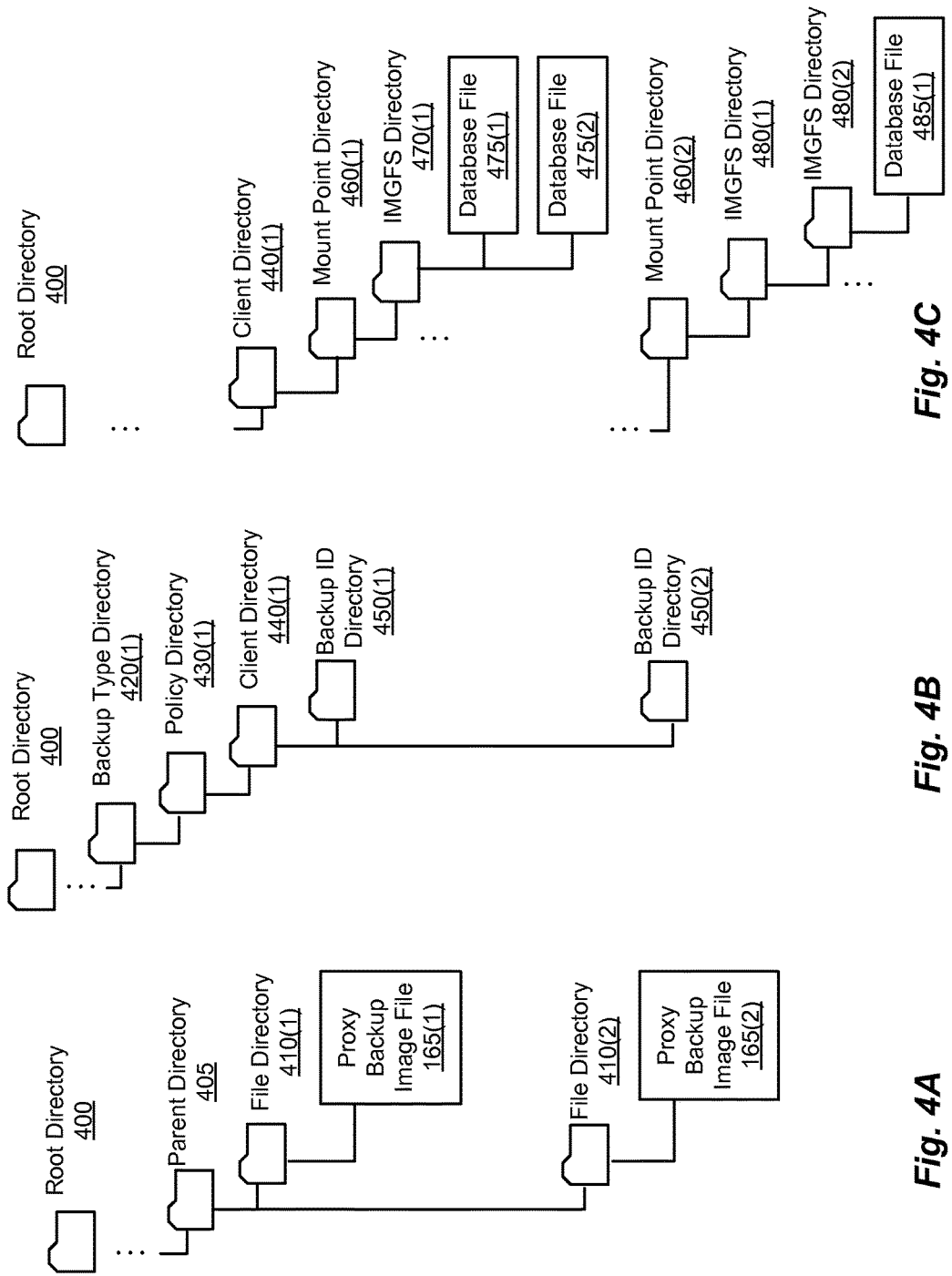

RESTORING A DATABASE TO MANAGED STORAGE FROM A PROXY BACKUP IMAGE

FIELD OF THE INVENTION

The present disclosure relates to performing backup and restore operations, and more particularly, to restoring a proxy backup image of a database to managed storage.

DESCRIPTION OF THE RELATED ART

An ever-increasing reliance on information and computing systems that produce, process, distribute, and maintain such information in its various forms, continues to put great demands on techniques for providing data storage and access to that data storage. Business organizations can produce and retain large amounts of data. While data growth is not new, the pace of data growth has become more rapid, the location of data more dispersed, and linkages between data sets more complex.

An organization can implement a backup scheme to backup or protect data located on various computing devices of the organization, such as databases. An organization may use a number of disparate software applications directed to managing such data. However, certain interactions between the software applications may not be supported, where particular functionalities are not available to the organization due to this lack of support. The organization may not discover this lack of functionality until after the functionality is needed, possibly causing the organization to lose data.

BRIEF DESCRIPTION OF THE DRAWINGS

The present disclosure may be better understood, and its numerous objects, features and advantages made apparent to those skilled in the art by referencing the accompanying drawings.

FIG. 3A is a simplified block diagram illustrating components of an example database file system, according to one embodiment.

FIG. 3B is a simplified block diagram illustrating components of an example proxy backup image file, according to one embodiment.

FIG. 4A-4C are simplified block diagrams illustrating components of an example file system directory structure, according to one embodiment.

Figure 1:
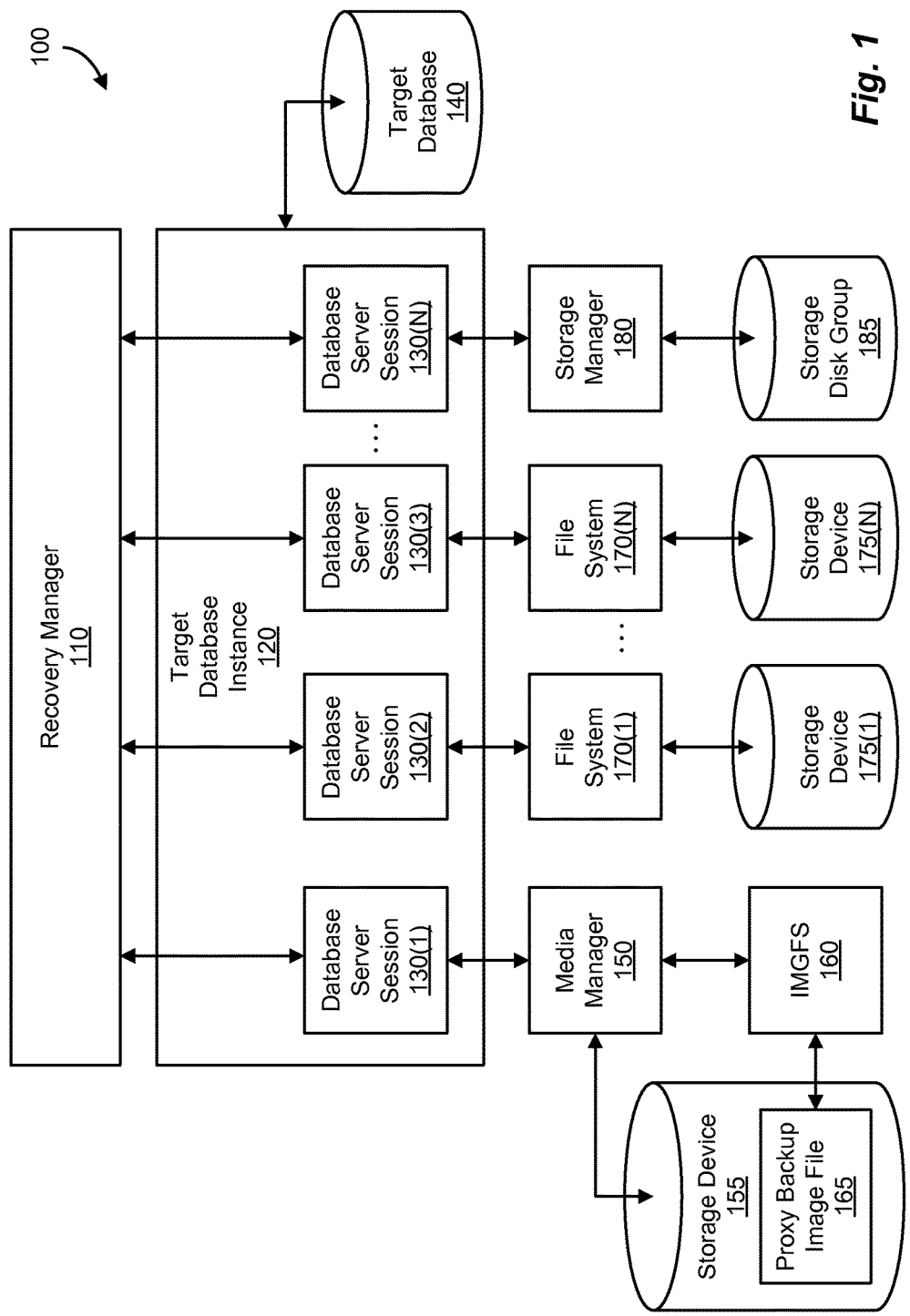
FIG. 1 is a simplified block diagram illustrating components of an example backup and restore system in which the present disclosure can be implemented, according to one embodiment.

While the present disclosure is susceptible to various modifications and alternative forms, specific embodiments of the present disclosure are provided as examples in the drawings and detailed description. It should be understood that the drawings and detailed description are not intended to limit the present disclosure to the particular form disclosed. Instead, the intention is to cover all modifications, equivalents, and alternatives falling within the spirit and scope of the present disclosure as defined by the appended claims.

DETAILED DESCRIPTION

Overview

The present disclosure describes embodiments for implementing a virtual image file system, referred to as IMGFS (IMaGe File System). A mount point directory is created in a local file system, where the local file system organizes files on a storage device. The mount point directory corresponds to a proxy backup image file stored on the storage device. The proxy backup image files stores an image file system. The (stored) image file system is mounted on the local file system at the mount point directory, using a virtual (image) file system. The virtual file system implements an interface configured to access the image file system.

In some embodiments, a notification is provided to a recovery manager that indicates the recovery manager should catalog one or more database files of the proxy backup image file. File attributes and/or file content of the database files can be provided to the recovery manager, which can be read by the virtual file system from the image file system. One or more database files can be restored to a second storage device, such as a group of physical disks that are managed as a single storage unit.

Example Embodiments

FIG. 1 is a simplified block diagram illustrating components of an example backup and restore system 100 in which the present disclosure can be implemented. Backup and restore system 100 includes a recovery manager 110, a target database instance 120, one or more database server sessions 130(1)-(N), a target database 140, IMGFS 160, media manager 150 and associated storage device 155, one or more file systems 170(1)-(N) and associated storage devices 175(1)-(N), a storage management instance 180 and associated storage disk group 185. Each component is discussed in further detail below.

Recovery manager 110 is a database management application that manages backup, restore, and recovery operations for a database, such as target database 140. Recovery manager 110 is executed or hosted on one or more host systems. A host system can be implemented using, for example, a desktop computer, a laptop computer, a workstation, a server, or the like. An example of such computing devices is described subsequently, in connection with FIG. 8.

Target database 140 is an object and/or relational database that stores an organized collection of data. Target database 140 consists of a number of database files, which are further discussed below in relation to FIG. 3A. Multiple databases (not shown) can be implemented in backup and restore system 100 using cluster database software. Target database 140 is stored in one or more storage devices.

Target database instance 120 is a set of memory structures and processes that manage the database files of target database 140. Target database instance 120 provides access to target database 140 (e.g., provides access to the data stored in target database 140). A database instance is associated with only one database at a time, but each database can be associated with one or more database instances. In the embodiment shown, target database instance 120 is associated with target database 140. One or more database instances can be executed concurrently on a host system, but preferably each database instance is executed on a separate host system. Target database instance 120 is executed or hosted on a host system that is communicatively coupled to target database 140.

Recovery manager 110 is configured to be communicatively coupled with target database instance 120 in order to manage backup, restore, and recovery operations for target database 140. In one embodiment, the host systems of recovery manager 110 and target database instance 120 are communicatively coupled via a communications channel or a network. An example network is a local area network (LAN) utilizing Ethernet, IEEE 802.11x, or some other communications protocol. In one embodiment, the host systems of recovery manager 110 and target database instance 120 are communicatively coupled using connectivity software. In another embodiment, recovery manager 110 and target database instance 120 are hosted on the same host system and are configured to communicate internally within the host system.

Storage manager 180 is a volume manager and file system for files stored in storage disk group 185. An example storage manager is an ASM (Automatic Storage Management) manager. Storage manager 180 controls (or manages) a storage disk group 185, which is a group of physical disks that are controlled as a single storage unit. Storage manager 180 stores files (e.g., database files) as managed files in storage disk group 185. A managed file is completely contained within a single storage disk group, but is arbitrarily allocated across a number of physical disks in the storage disk group. Storage manager 180 controls the file name and location of managed files. Storage disk group 185 serves as backup storage for target database 140, where storage disk group 185 stores one or more backup image files. A backup image file includes a secondary, or backup, copy of one or more database files of target database 140. Storage disk group 185 can also be configured as a fast recovery area (FRA) for target database 140, where storage disk group 185 serves as a centralized repository for database files of target database 140.

Storage devices 175(1)-(N) are each configured to store file data of a number of files, such as backup image files, database files, and the like. Storage devices 175(1)-(N) serve as backup storage for target database 140 (e.g., can store one or more backup image files that include copies of database files of target database 140). Each of storage devices 175(1)-(N) is associated with a respective one of local and/or network file systems 170(1)-(N). Each file system 170 is responsible for organizing the files of the respective storage device 175 into logical groups using, for example, directories or folders. One or more file systems 170(1)-(N) are hosted on various host systems or locally hosted (e.g., hosted on the same host system as target database instance 120). File systems are further discussed below in relation to FIG. 4A.

Storage device 155 is also configured to store file data of a number of files, such as backup image files, database files, and the like. Storage device 155 serves as tertiary backup storage for target database 140 (e.g., can store one or more backup image files that include copies of database files of target database 140). Storage device 155 is also associated with a local file system (not shown) responsible for organizing the files stored on storage device 155, which is further discussed below in relation to FIG. 4A. Storage device 155 operates under control of media manager 150, which is executed or hosted on a host system such as a media server. An example media manager is NetBackup, available from Symantec Corp. of Mountain View, Calif. Recovery manager 110 and media manager 150 are configured to communicate with one another. In one embodiment, recovery manager 110 and media manager 150 are hosted on different host systems. In another embodiment, recovery manager 110 and media manager 150 are hosted on the same host system. Media manager 150 is further discussed below in relation to FIGS. 2A and 2B.

In order to implement a backup, restore, or recovery operation for target database 140, recovery manager 110 allocates one or more connections or channels for communication with target database instance 120. Each channel corresponds to one of a number of database server sessions 130(1)-(N) on target database instance 120. A database server session 130 is a background process that is directed by recovery manager 110 to perform a backup, restore, or recovery operation (e.g., database server session 130 executes backup, restore, and recovery commands received from recovery manager 110 via an allocated channel). One or more database server sessions 130(1)-(N) are allocated on target database instance 120, where each database server session 130 is capable of accessing target database 140 (e.g., accessing the data stored in target database 140). Recovery manager 110 communicates with a corresponding database server session via a disk channel when storing a backup image file to disk, or via a tape channel when storing a backup image file to tape or other storage device controlled by a media manager.

In one embodiment, a database server session that performs a backup operation is responsible for reading backup data (e.g., reading a copy of one or more database files) from target database 140 and transferring the backup data to a destination storage device or to media manager 150 that controls the destination storage device 155. In one embodiment, the backup data is stored in storage device 155 as a backup image file that includes a copy of one or more database files of target database 140. In one embodiment, a database server session that performs a restore operation uses backup data from an existing backup image file on storage device 155 to overwrite one or more database files located in target database 140, in one of storage devices 175(1)-(N), or in storage disk group 185. In one embodiment, a database server session that performs a recovery operation uses one or more restored database files to apply changes to a database, which is target database 140 or a database located in one of storage devices 175(1)-(N) or storage disk group 185.

Traditionally, a backup operation is performed in one of two modes: a stream mode and a proxy mode. In stream mode, recovery manager 110 controls the data transfer between target database 140 and the destination storage device via a database server session. For example, backup data is received from the database server session at media manager 150 that controls (destination) storage device 155, where the backup data is received in a recovery manager-specific and/or proprietary format, such as in backup sets and backup pieces. A backup set is a logical structure that includes one or more backup pieces. A backup piece is a logical grouping (e.g., a file) that includes backup data. The backup data, or the copies of one or more database files, is arbitrarily included in the backup pieces of the backup sets. The backup sets are then stored in the format received (e.g., as-is) in storage device 155 as a stream backup image file. Often, the recovery manager does not provide an open API (application programming interface) that would allow manipulation of the backup data stored in recovery manager-specific and/or proprietary format in a stream backup image file.

Proxy mode can be used if media manager 150 supports such a mode (e.g., recovery manager 110 queries media manager 150 to determine if the media manager supports a proxy mode). In proxy mode, recovery manager 110 hands control of the data transfer to media manager 150. Recovery manager 110 sends a list of data files to media manager 150, indicating that the files specified in the list of files need to be backed up (e.g., added to a backup image file). Media manager 150 reads a copy of each file included in the list of data files via the database server session and stores the files as regular OS (operating system) files in a proxy backup image file. The resulting proxy backup image file is stored as a sparse file in a destination storage device under control of the media manager, such as storage device 155.

The mode used to generate a backup image file is also the same mode used to restore from the backup image file. In other words, a backup image file generated in stream mode (referred to as a stream backup image file) is used in a stream restore operation, while a backup image file generated in proxy mode (referred to as a proxy backup image file) is used in a proxy restore operation.

During a stream restore operation (e.g., initiated by recovery manager 110 using a tape channel), media manager 150 reads data from the stream backup image file (stored in storage device 155) and sends the data to recovery manager 110. Recovery manager 110 then writes the data to the destination location, which is located in one of storage devices 175(1)-(N), storage disk group 185, or target database 140. During a proxy restore operation (e.g., initiated by recovery manager 110 using a tape channel), media manager 150 receives a destination database file path (or destination location) from recovery manager 110. Media manager 150 then reads data from the proxy backup image file (stored in storage device 155) and writes the data to the destination database file, which is located in one of storage devices 175(1)-(N) or target database 140.

Since storage manager 180 internally controls the location of managed files, media manager 150 cannot learn the destination location in storage disk group 185, and thus cannot directly write to storage disk group 185 using native OS (operating system) commands from a proxy backup image file. Further, since the backup data is arranged arbitrarily in a stream backup image file (and no open APIs (application programming interfaces) are available for translation), media manager 150 cannot translate the backup data of a proxy backup image file into a stream backup image file. However, recovery manager 110 is configured to communicate with storage manager 180 in order to read and write managed files, and thus can be used to migrate data into storage disk group 185.

A number of alternatives have been developed using recovery manager 110 to restore a proxy backup image to storage disk group 185. For example, the recovery manager restores a proxy backup image file to a temporary file system, where the restored database files in the temporary file system is then copied into storage disk group 185 (e.g., the restored database files are read from the temporary file system and transmitted to storage disk group 185 via recovery manager 110). This alternative requires extra disk space for the temporary file system and extra time to complete the restore to storage disk group 185 (e.g., time to perform both restore to file system and copy to storage disk group, which takes twice as long as directly restoring data to the storage disk group). In another example, the recovery manager backs up the target database as a regular file system, where the backed up database files are copied into storage disk group 185 (e.g., the backed up database files in the regular file system are read from the regular file system and transmitted to storage disk group 185 via recovery manager 110). This alternative similarly requires extra disk space for the regular file system and extra time to complete the restore to storage disk group 185 (e.g., time to perform both backup as file system and copy to storage disk group, which takes twice as long as directly restoring data to the storage disk group).

The present disclosure provides for implementation of IMGFS, or a virtual image file system that provides a view to an image file system stored in a proxy backup image file. IMGFS 160 is used to directly restore data to storage disk group 185 from proxy backup image file 165, which includes copies of one or more database files of target database 140. IMGFS 160 is configured to provide access to the database files stored within proxy database image file 165. The proxy backup image file is mounted to a local file system at a mount point directory using IMGFS 160. IMGFS 160 provides an interface configured to access the image file system stored in the proxy backup image file, allowing the database files stored within proxy backup image file 165 to be viewed within the mount point directory. Recovery manager 110 is also notified of the presence of the database files within the proxy backup image file, where recovery manager 110 refers to the database files in a future restore or recovery operation of target database 140 (e.g., recovery manager 110 requests the media manager to restore one or more database files from the proxy backup image file). File data of the one or more database files stored in the proxy backup image file can be used to perform a restore process by reading file data directly from the proxy backup image file as if the proxy backup image file were a regular file system and transmitting the file data to storage disk group 185 via recovery manager 110. In one embodiment, such a restore operation is performed using a disk channel (rather than, for example, a tape channel). IMGFS 160 can be implemented on a host system that is communicatively coupled to storage device 155 (e.g., hosted on the media server that controls storage device 155). IMGFS 160 is further discussed below in relation to FIGS. 2A and 2B, and proxy backup image files are further discussed below in relation to FIG. 3B.

In light of the present disclosure, it will be appreciated that target database 140, storage device 155, storage devices 175(1)-(N), and physical disks of storage disk group 185 can be implemented by any type of computer-readable storage medium, including, but not limited to, internal or external hard disk drives (HDD), optical drives (e.g., CD-R, CD-RW, DVD-R, DVD-RW, and the like), flash memory drives (e.g., USB memory sticks and the like), tape drives, removable storage in a robot or standalone drive, and the like. Alternatively, it will also be appreciated that, in light of the present disclosure, backup and restore system 100 can include other components such as routers, firewalls and the like that are not germane to the discussion of the present disclosure and will not be discussed further herein. It will also be appreciated that other configurations are possible. For example, recovery manager 110, target database instance 120, and IMGFS 160 can be hosted on different computing devices or on a single computing device, and so on.

The letter N is used to indicate a variable number of devices or components. For example, a variable number of storage devices are implemented in the backup and restore system. Although the letter N is used in describing a variable number of instances of each of these different devices and components, a repeated use of the letter N does not necessarily indicate that each device and component has a same number of N instances implemented in the backup and restore system.

Figure 2A:
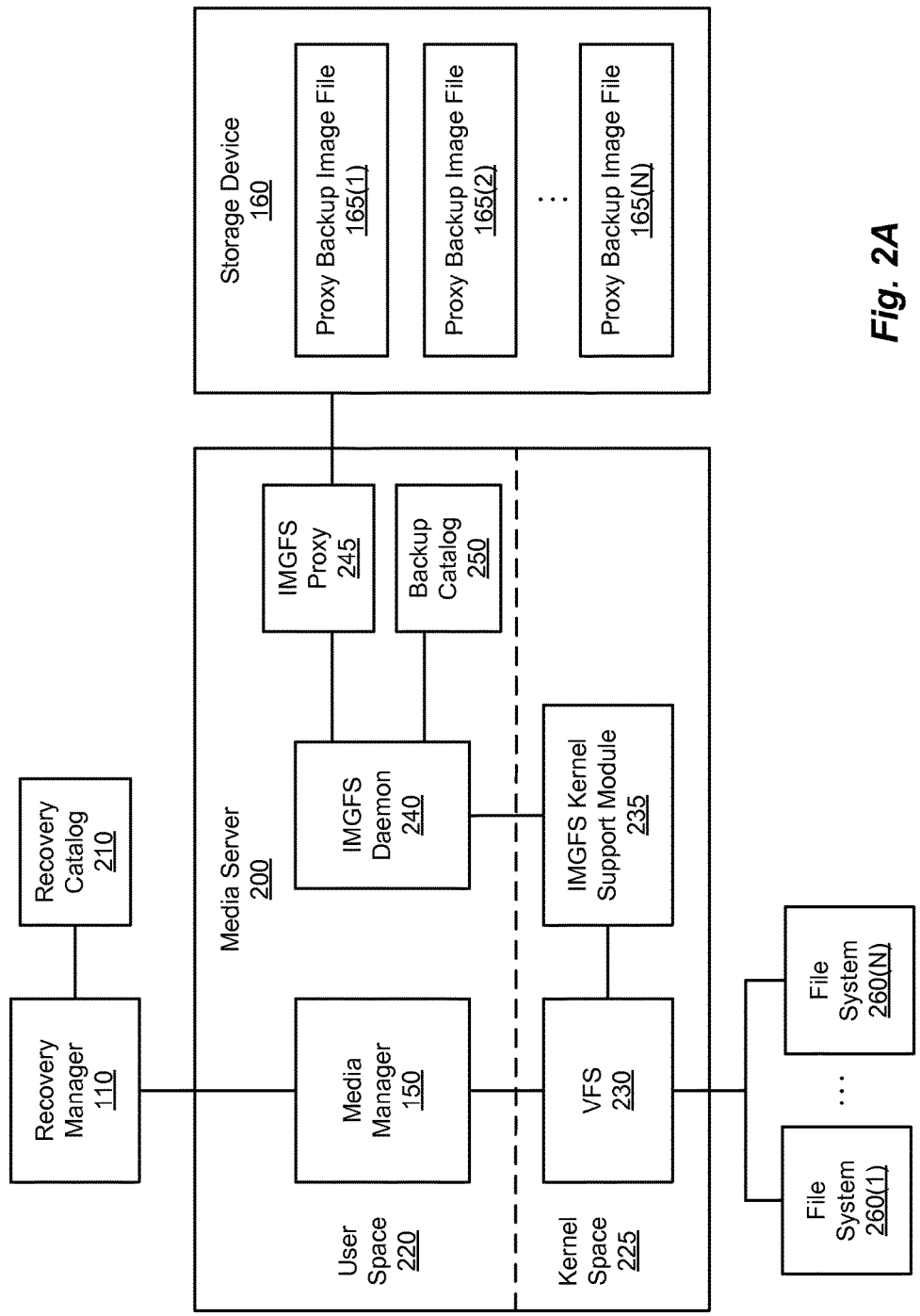
FIGS. 2A and 2B are simplified block diagrams illustrating components of one or more example media servers in which the present disclosure can be implemented, according to one embodiment.

FIG. 2A is a simplified block diagram illustrating components of an example media server 200 in which the present disclosure can be implemented. Media server 200 includes a media manager 150, a VFS (virtual file system) 230, an IMGFS kernel support module 235, an IMGFS daemon 240, an IMGFS proxy 245, and a backup catalog 250. Media server 200 is communicatively coupled to storage device 155, which stores a number of proxy backup image files 165(1)-(N). Media server 200 is also communicatively coupled to one or more file systems 260(1)-(N) and a recovery manager 110, which in turn is communicatively coupled to a recovery catalog 210. These components are further discussed below.

In one embodiment, recovery manager 110 maintains metadata about target database 140 in a recovery catalog 120, which recovery manager 110 uses to determine which database files to use in a restore and/or recovery operation for target database 140. Such database metadata includes names, locations (e.g., a full or relative file path that indicates a location), creation times, and SCNs (system change numbers, further discussed below in relation to FIG. 3A) of database files (e.g., data files, control files, redo logs, and archived redo logs of target database 140), copies of database files, and backup image files that include the database files, which is stored in various storage devices in backup and restore system 100. The database metadata also includes tablespaces, scripts, and settings. A database file has a corresponding recovery catalog entry that contains metadata corresponding to the database file.

Media manager 150 provides backup and restore services to recovery manager 110 by storing data to and reading data from storage device 155. Media manager 150 maintains metadata about backup image files in a backup catalog 250, which is used to perform backup and restore operations for target database 140. Such backup metadata includes names and locations (e.g., a full or relative file path that indicates a location) of backup image files stored in one or more storage devices controlled by media manager 150, such as storage device 155. Media manager 150 is configured to communicate with recovery manager 110 either directly via a media manager interface compatible with recovery manager 110 or indirectly via a database server session.

In one example, recovery manager 110 initiates a backup operation for target database 140 in proxy mode, where media manager 150 is responsible for generating a proxy backup image file for target database 140. The resulting proxy backup image file is stored in storage device 155, such as one of proxy backup image files 165 (1)-(N). Proxy backup image file 165 includes a copy of one or more database files of target database 140. Recovery manager 110 records the name and location of proxy backup image file 165 in an associated entry in recovery catalog 120. Media manager 150 also records the name and location of proxy backup image file 165 in an associated entry in backup catalog 250. In one embodiment, the location of a proxy backup image file 165 is the file path of proxy backup image file 165, according to the local file system of storage device 155 (which is further discussed below in relation to FIG. 4A).

Since media manager 150 is responsible for generating and storing the proxy backup image file, recovery manager 110 does not immediately know where the particular database files are stored within proxy backup image file 165 and/or storage device 155. The present disclosure provides that media manager 150 mounts proxy backup image file 165 to the local file system of storage device 155 at a mount point directory using IMGFS 160, which attaches or grafts the image file system (e.g., database files and directories of proxy backup image file 165) onto the local file system at the mount point directory. As a result, the database files stored within proxy backup image file 165 become accessible as a number of files and/or directories at the mount point directory. The database files can then be accessed by file system calls via IMGFS 160, just as if proxy backup image file 165 were a regular file system. Thus, recovery manager 110 can determine the locations of the particular database files that are stored within proxy backup image file 165 via IMGFS 160. In one embodiment, the location of a particular database file is the file path of the particular database file, according to the local file system of storage device 155 that includes the image file system mounted at the mount point directory (which is further discussed below in relation to FIG. 4C).

Continuing the above example, once proxy backup image file 165 is mounted using IMGFS 160, media manager 150 notifies recovery manager 110 that additional database files that are located at the location of proxy backup image file 165 need to be cataloged. Recovery manager 110 requests file attributes of each database file stored within proxy backup image file 165 from IMGFS 160. A new recovery catalog entry is created for each database file stored in proxy backup image file 165 and added to recovery catalog 210. A recovery catalog entry corresponding to a particular database file includes file attributes of the particular database file and the location of the particular database file.

In one embodiment, when recovery manager 110 initiates a future restore or recovery operation for target database 140, recovery manager 110 consults recovery catalog 210 to determine the location of the particular database files that should be restored. Recovery manager 110 requests the contents of the particular database files from media manager 150 using file system calls that are conveyed to IMGFS 160. IMGFS is further discussed below.

An OS (operating system) executing on media server 200 divides memory space into user space 220 and kernel space 225. Kernel space 225 is reserved for executing the kernel, or the basic component of the OS that manages the media server's resources (e.g., hardware and software resources). User space 220 is reserved for executing user applications (e.g., software programs and libraries).

VFS (virtual file system) 230 provides the kernel with access to a number of different file systems, such as local and network file systems 260(1)-(N). VFS 230, which is implemented in kernel space 225, serves as an abstraction layer or interface that enables an application (e.g., running in user space 220) to access file data located in various local and/or network file systems 260(1)-(N). A user application issues a file system call to the kernel, which is directed to VFS 230. VFS 230 locates the file system in which the requested file is located and handles the data access for the requested file (e.g., requests file data of the requested file from the identified file system and returns the file data to the user application).

IMGFS is a virtual file system that provides a view into a proxy backup image file that stores an image file system. IMGFS serves as an interface between proxy backup image file 165 and VFS 230 that enables an application (e.g., media manager running in user space) to access file data located in the (stored) image file system. IMGFS can be implemented in kernel space 225 or user space 220. Implementing IMGFS in kernel space 225 requires editing the kernel code to implement IMGFS, such as editing kernel code to include various components of IMGFS including IMGFS daemon 240 and IMGFS proxy 245 (which are further discussed below). Kernel code can be edited by privileged users (e.g., users with administrative rights) to implement IMGFS. However, since even small errors made while editing kernel code can result in an inoperable media server 200, it may be preferable to implement IMGFS in user space 200 using a loadable kernel support module. Further, non-privileged users (e.g., users without administrative rights) that cannot edit kernel code can also implement IMGFS in user space 200 using a loadable kernel support module.

In the embodiment shown, IMGFS is implemented in user space 220 using various components that include IMGFS kernel support module 235, IMGFS daemon 240 and IMGFS proxy 245. IMGFS kernel support module 235 is a loadable kernel support module (e.g., extends functionality of the kernel) that includes library and protocol support for IMGFS. IMGFS kernel support module 235 provides a kernel-compatible interface to VFS 230, allowing access to the image file system stored in proxy backup image file 165 via VFS 230 without needing to edit kernel code.

When VFS 230 receives a file system call for a requested file and determines the requested file is located in IMGFS, VFS 230 forwards the file system call to IMGFS kernel support module 235. IMGFS kernel support module 235 then forwards the file system call to IMGFS daemon 240. IMGFS daemon 240 supports a number of file system calls, such as opendir (open directory), readdir (read directory), closedir (close directory), stat (return file attributes), open (open file), read (read file), and close (close file). IMGFS daemon 240 is configured to parse the parameters of file system call and issues a corresponding request to IMGFS proxy 245, which performs the request. IMGFS proxy 245 provides APIs (application program interfaces) that are configured to interpret or translate the raw data stored in the proxy backup image file into one or more database files (e.g., regular OS files) and/or directories (e.g., regular OS directories). In other words, IMGFS proxy 245 is configured to access the image file system stored in the proxy backup image file.

For example, IMGFS proxy 245 can receive a request to read file data of a requested file. File data can include file attributes of the requested file and/or file content of the requested file. Once IMGFS proxy 245 has retrieved the requested file data from proxy backup image file 165 (e.g., has read file data from the image file system), IMGFS proxy 245 returns the file data to IMGFS daemon 240, which in turn returns the file data to IMGFS kernel support module 235. The file data is passed from IMGFS kernel support module 235 to VFS 230, on to media manager 150, and finally on to recovery manager 110. IMGFS daemon 240 and IMGFS proxy 245 are further discussed below in relation to FIG. 5-7.

Figure 2B:
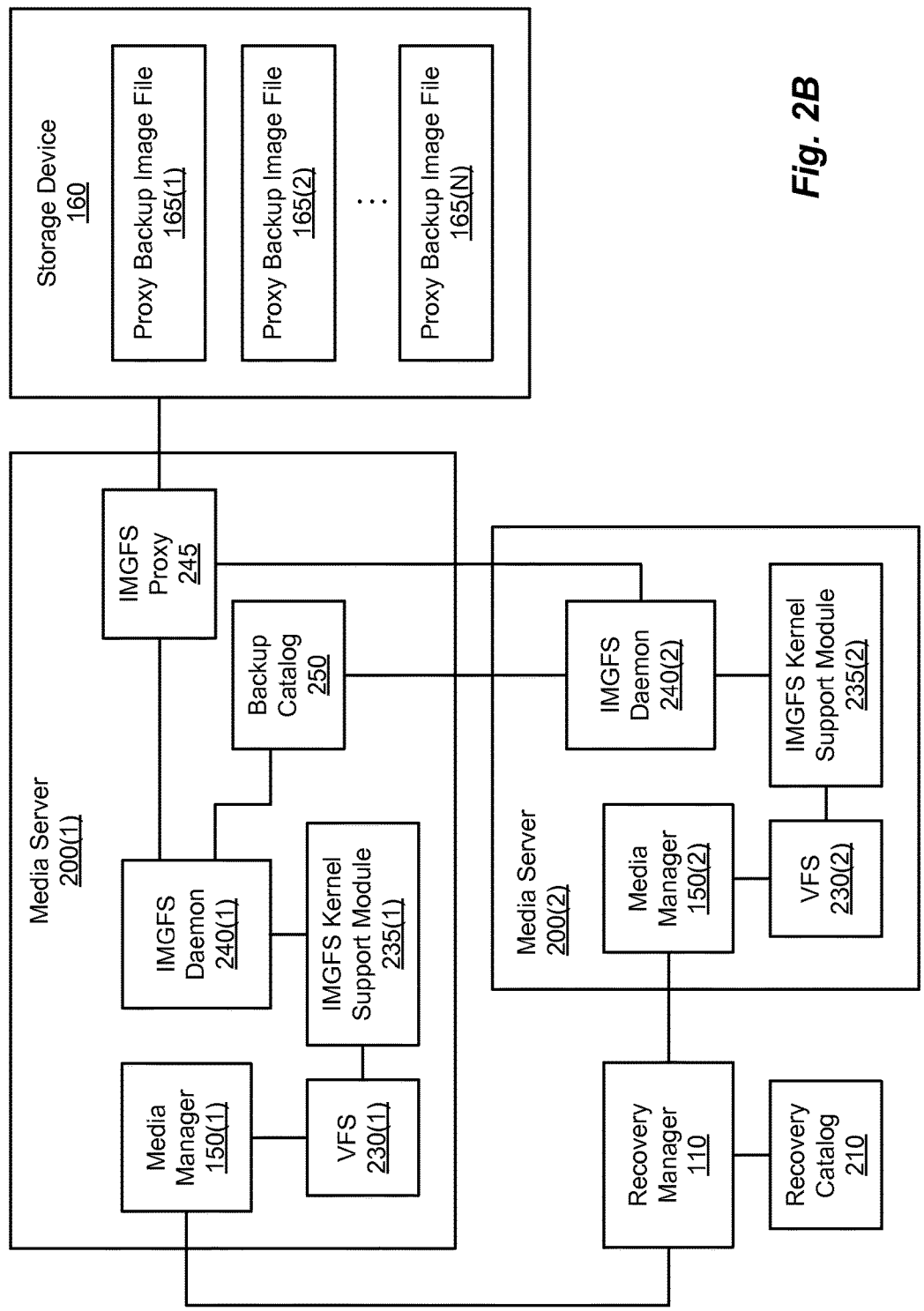

FIG. 2B is a simplified block diagram illustrating components of two or more example media servers in which the present disclosure can be implemented. In the embodiment shown, media servers 200(1) and 200(2) each implement components of IMGFS. Media server 200(1) implements IMGFS daemon 240(1), IMGFS proxy 245, and IMGFS kernel support module 235(1), as well as media manager 150(1) and VFS 230(1). Media server 200(2) implements a second IMGFS daemon 240(2) and IMGFS kernel support module 235(2). IMGFS daemon 240(2) is configured to communicate with IMGFS proxy 245 and access backup catalog 250, both located on media server 200(1). Media server 200(2) also implements media manager 150(2) and VFS 230(2), which can be in cooperative communication with their counterparts on media server 200(1). Recovery manager 110 can communicate with both media servers 200(1) and (2). Although only one recovery manager 110 is illustrated in FIG. 2B, recovery manager 110 can be executed on numerous host systems, where one or more instances of recovery manager 110 can communicate with media manager 150(1) and/or media manager 150(2) in order to perform backup, restore, and/or recovery operations. Thus, IMGFS can be scalable across multiple media servers, where request for files are forwarded from a recovery manager to IMGFS proxy 245 via one or more IMGFS daemons 240(1)-(N).

FIG. 3A is a simplified block diagram illustrating components of an example database file system 300. Target database 140 includes a number of database files that together implement target database 140. The database files (and thus target database 140) are stored in a local file system of a storage device, illustrated as database file system 300 in FIG. 3A. Database file system 300 includes a root, or top-most, directory 305, which contains one or more database directories 310(1)-310(N), one or more data files 310 (1)-(N), one or more control files 320(1)-(N), and one or more archived redo logs 330(1)-(N). Data files 315(1)-(N) store the target database's organized collection of data. Data is written to one or more data files 315(1)-(N) by a target instance associated with the target database. Control file 320 stores structure information about the target database, such as the name of the target database, the names and locations of data files and redo logs associated with the target database, and the beginning SCN (system change number) and end SCN for data files 310 of the target database. A system change number is used to track the order of transactions made to target database 140. Redo logs (not shown) store an ongoing history of the transactions made in the target database with their respective (and unique) SCN, which is used to recover the target database. Each SCN is (continuously) recorded in the redo logs, as well as written to control files and headers of data files. Redo logs are not backed up (e.g., are not included in a backup image file), but instead are first archived by copying the redo logs to a new location, and are referred to as archived redo logs 330(1)-(N). Archived redo logs 330(1)-(N) are then backed up during a backup process (e.g., included in a backup image file). As will be appreciated, database file system 300 can include a number of other files and directories that are not shown.

FIG. 3B is a simplified block diagram illustrating components of an example proxy backup image file 165. Media manager 150 requests and receives backup data from a database server session in native OS format. Backup data is file data copied from one or more database files of target database 140 that are included in a list of files to be backed up (e.g., backup data includes a copy of one or more database files of target database 140). Media manager 150 then stores the backup data in proxy backup image file 165 in the same native OS format. In the embodiment shown, the database files that include data files 315(1)-(N), control file 320(1), and archived redo logs 330(1)-(N) are stored in a similar file system directory structure as the file system directory structure of database file system 300. In other words, one or more directories of database file system 300 are also copied and stored in the proxy backup image file, resulting in a file system stored in the proxy backup image file (which is referred to as an image file system). Thus, a partial or full copy of the database file system that includes the particular database files (e.g., database files that are specified by the recovery manager to be backed up) is stored as an image file system in the proxy backup image file. File systems are further discussed below in relation to FIG. 4A.

FIG. 4A is a simplified block diagram illustrating components of an example file system directory structure of the local file system of storage device 155. A file system is used to organize files into logical groups using directories or folders. A directory or folder acts as a container that includes an arbitrary number of files (e.g., zero or more). A directory is considered a special type of file, allowing a directory to include another directory, which is referred to as a subdirectory. A file system can be represented as a directory structure, such as a hierarchical tree structure that is rooted at a root directory. In a hierarchical tree structure, subdirectories are branches of the hierarchical tree structure. A directory structure can alternatively be a linear tree structure (e.g., flat file system). Examples of a file system include Common Internet File System (CIFS) or Server Message Block (SMB), Network File System (NFS), New Technology File System (NTFS, available from Microsoft® of Redmond, Wash.), and the like.

The example file system directory structure illustrated in FIG. 4A is a hierarchical file system directory structure that organizes files (e.g., backup image files) stored in storage device 155. Root directory 400 is the root, or top-most directory, of the local file system directory structure, which contains a number of directories and files. A number of subdirectories (or nested directories) can be created in root directory 400. Parent directory 405 is one such subdirectory and serves as a working directory in the local file system of storage device 155 in which one or more proxy backup image files 165(1)-(N) can be stored. As will be appreciated, one or more proxy backup image files 165(1)-(N) can also be stored elsewhere in the local file system outside of parent directory 405.

As part of the proxy backup process that generates a new proxy backup image file, media manager requests that a new file directory 410 be created in the local file system (e.g., sends a request to the local file system to generate a new directory) for the newly generated backup proxy image file. The new file directory has a full file path that uniquely identifies the file directory from other directories in the local file system. The newly generated backup proxy image file is stored in the corresponding new file directory. In one embodiment, a new file directory 410 is generated within root directory 400 for each newly generated proxy backup image file. In another embodiment, multiple proxy backup image files can be stored in a single file directory 410. Once stored, each proxy backup image file has a full file path that uniquely identifies the proxy backup image file from other files in the local file system.

FIG. 4B is a simplified block diagram illustrating components of an example file system directory structure of the local file system of storage device 155 that includes one or more new directories that will serve as mount point directories. A mount point directory in a local file system serves as the point at which another file system (such as an image file system stored in a proxy backup image file) can be attached to the local file system. In one embodiment, a new mount point directory corresponding to the newly generated proxy backup image file is also generated during the proxy backup process. An identifier of the mount point directory (e.g., a relative or full file path) can also be stored in an entry of the backup catalog that corresponds to the newly generated proxy backup image file.

The naming convention for creating new mount point directories is based on a number of identifiers obtained from the backup catalog. For example, the media manager obtains the backup type ID (identifier), policy ID, client ID, and backup ID (identifier) of the newly generated proxy backup image file. The backup type ID identifies the type of the proxy backup image file (e.g., a proxy backup image file can be a full backup or a partial backup). The policy ID identifies the backup policy used to generate the proxy backup image file. A backup policy describes how the proxy backup image file is generated, such as indicating the particular files that should be backed up (e.g., which files should be included in a proxy backup image file) and when and how often the files should be backed up (e.g., when and how often a proxy backup image file should be generated). The client ID identifies the client system that hosts the files that are being backed up (e.g., the target database host system). The backup ID identifies the particular proxy backup image file.

In order to create a new mount point directory, one or more directories (such as a series of subdirectories or nested directories) are generated for each identifier obtained from the backup catalog that is associated with the newly generated proxy backup image file. In one example, the relative file path of the new mount point directory is /BackupType/Policy/Client/BackupID where BackupType is a directory that corresponds to the associated backup type ID, Policy is a subdirectory that corresponds to the associated policy ID, Client is a subdirectory that corresponds to the associated client ID, BackupID is a subdirectory that corresponds to the associated backup ID. As will be appreciated, the relative file path of the new mount point directory can include other directories that are not shown. The four nested directories of relative file path /BackupType/Policy/Client/BackupID are respectively illustrated in FIG. 4B as backup type directory 420, policy directory 430, client directory 440, and backup ID directory 450, where each backup ID directory 450 corresponds to a single proxy backup image file of one or more proxy backup image files 165(1)-(N). In the embodiment shown, backup ID directory 450(1) corresponds to proxy backup image file 165(1) and backup ID directory 450(2) corresponds to proxy backup image file 165(2).

Root directory 400 can include one or more backup type directories 420(1)-(N), one or more policy directories 430(1)-(N), one or more client directories 440(1)-(N), and one or more backup ID directories 450(1)-(N). Backup type directories 420, policy directories 430, and client directories 440 may be shared directories. For example, FIG. 4B illustrates that client directory 440(1) contains both backup ID directory 450(1) and 450(2). A full file path can point to the same location of the new mount point directory, which is written in reference to root directory 400 of the local file system (e.g., the full file path includes the intervening directories from the root directory down to the proxy backup image file).

FIG. 4C is a simplified block diagram illustrating components of an example file system directory structure of the local file system of storage device 155 that includes an image file system directory structure mounted at a mount point directory. IMGFS is a virtual file system that provides access to the image file system stored within a proxy backup image file. The proxy backup image file is mounted to the local file system at a mount point directory using IMGFS, making the image file system stored within the proxy backup image file accessible within the mount point directory (where the image file system is attached to the local file system at the mount point directory).

Using the file path of the /BackupType/Policy/Client/BackupID directory associated with the newly generated proxy backup image file as the mount point directory, media manager can mount the newly generated proxy backup image file to the local file system at the mount point directory using IMGFS. In the example shown, proxy backup image file 165(1) has been mounted at backup ID directory 450(1), which for clarity is illustrated as mount point directory 460(1) in FIG. 4C (where backup ID directory 450(1) in FIG. 4B has not yet been mounted). Once attached to the local file system, mount point directory 460(1) appears to contain the image file system stored in the proxy backup image file, which includes one or more directories (referred to herein as IMGFS directories) and one or more database files of (newly generated) proxy backup image file 165(1). Thus, one or more IMGFS directories 470(1)-(N) and database files 475(1)-(N) viewed in mount point directory 460(1) correspond to the one or more database directories 310(1)-(N) and database files (e.g., data files 315(1)-(N), control file 320(1), and archived redo log 330(1)-(N)) that are stored in the proxy backup image file 165(1). Mount point directory 460(2) (which corresponds to backup ID directory 450(2) in FIG. 4B) similarly appears to contain one or more IMGFS directories 480(1)-(N) and one or more database files 485(1)-(N) that correspond to proxy backup image file 165(2).

In one example, the relative file path of a particular database file stored within the proxy backup image file is
/BackupType/Policy/Client/BackupID/IMGFS_dir/database_file
where the Backup ID directory that contains the associated proxy backup image file (which is uniquely identified by the file path /BackupType/Policy/Client/BackupID) serves as the mount point directory of the associated proxy backup image file in this example, IMGFS_dir represents one or more directories included in the proxy backup image file that have become accessible via IMGFS, and database_file is the file name of the particular database file (which is contained in the one or more directories represented by IMGFS_dir). IMGFS_dir is illustrated as IMGFS directory 470, which contains the directories and files corresponding to a single proxy backup image file of one or more proxy backup image files 165(1)-(N). A full file path points to the same location of the particular database file, but is written in reference to the root directory (not shown) of the local file system (e.g., the full file path includes the intervening directories from the root directory down to the particular database file).

In one embodiment, IMGFS can be implemented using a loop device, or a pseudo-device that treats a file (e.g., a proxy backup image file) as a block device (e.g., a hard disk drive). The loop device and its functionality is implemented by IMGFS kernel support module. The loop device is associated with the proxy backup image file. The loop device is then mounted on (or logically connected to) the local file system at the specified mount point directory. The loop device provides an API to access the image file system stored within the proxy backup image file by interpreting or translating the raw data of the proxy backup image file into one or more database files (e.g., regular OS files) and/or directories (e.g., regular OS directories). Thus, file data can be read from the image file system stored in the proxy backup image file and made available to recovery manager via VFS.

Figure 5:
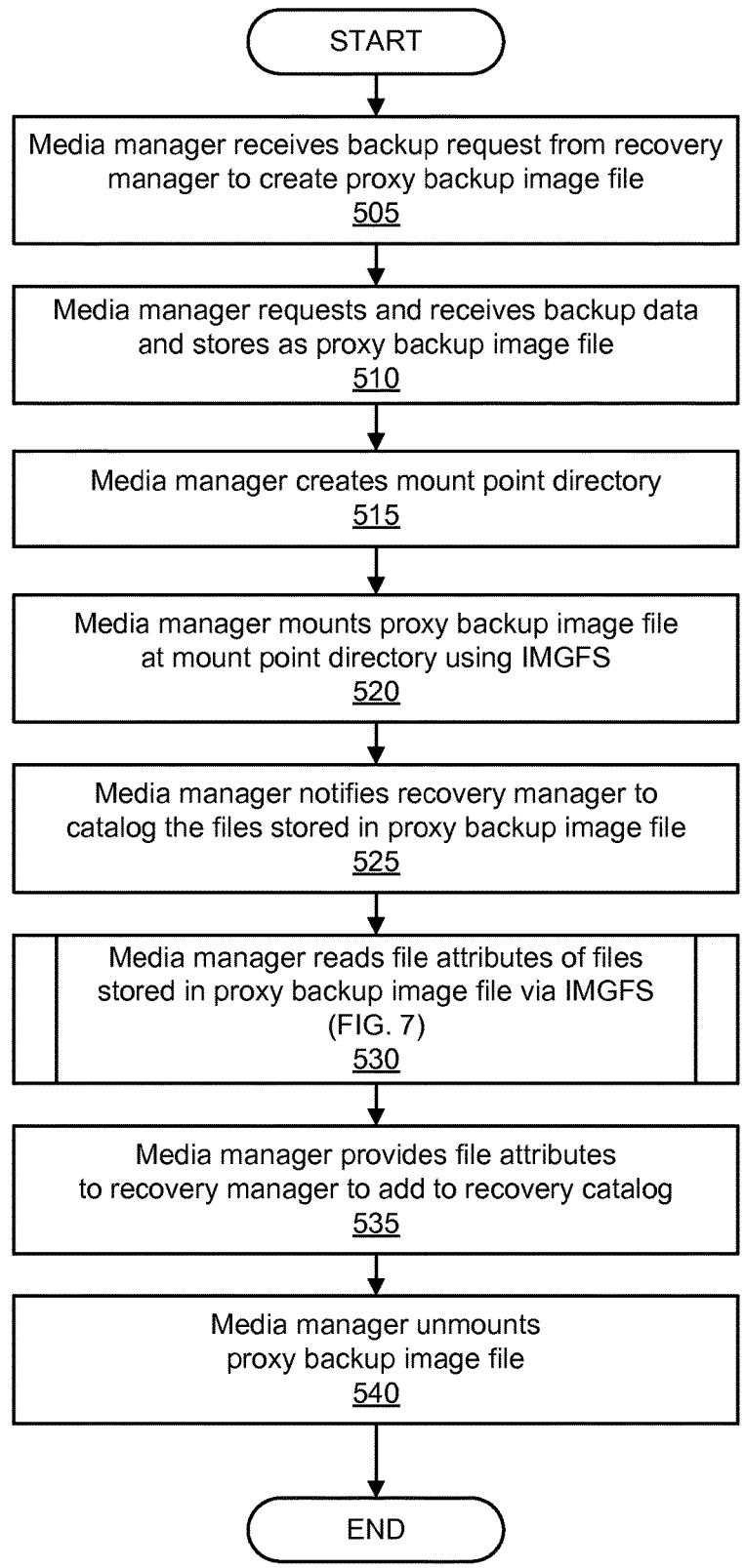
FIG. 5 is a flowchart illustrating an example backup process implemented by a media manager, according to one embodiment.

FIG. 5 is a flowchart illustrating an example backup process implemented by a media manager. The process illustrated in FIG. 5 can be triggered in response to receiving a backup request. The process starts at operation 505, where the media manager receives a backup request from a recovery manager, where the backup request (e.g., a backup command) instructs the media manager to create a backup image file of one or more database files of a target database in proxy mode (e.g., create a proxy backup image file of the target database). If the media manager does not support a proxy mode, the media manager notifies the recovery manager that the media manager cannot generate a proxy backup image file. In such a case, the recovery manager retains control of the data transfer and generates a backup image file in stream mode. If the media manger does support a proxy mode, the recovery manager transfers control of the data transfer to the media manager. The embodiment described in reference to FIG. 5 presumes that the media manager supports proxy mode. The media manager also receives a list of particular database files (e.g., a list of identifiers, such as file names and/or file paths that indicate locations) to backup from the recovery manager.

The process continues to operation 510, where the media manager requests and receives backup data of the particular database files from the database file system via a database server session (e.g., the media manager sends open and read requests for the particular database files). Media manager then stores the backup data as a proxy backup image file in a storage device controlled by the media manager. The process continues to operation 515, where the media manager creates a mount point directory in the local file system of the storage device, where the mount point directory corresponds to the proxy backup image file.

The process continues to operation 520, where the media manager mounts the proxy backup image file at the corresponding mount point directory, using IMGFS to view the image file system (e.g., a partial or full copy of the database file system that includes the particular database files) stored within the proxy backup image file. Operation 520 thus attaches the image file system (which includes the database files stored within the proxy backup image file) to the local file system of the storage device at the corresponding mount point directory. The process continues to operation 525, where the media manager notifies the recovery manager to catalog the files stored in the proxy backup image file, which are now accessible via IMGFS. The media manager indicates that the database files stored in the proxy backup image file (which are now visible and accessible as a regular file system via IMGFS) are backup files that have been created per the recovery manager's previous backup request and should now be added to the catalog.

In response, recovery manager initiates a catalog function that will record information about each file stored in the proxy backup image file. Starting at a directory relative to the mount point directory, recovery manager walks through the image file system of the proxy backup image file and requests file attributes (e.g., using file system calls) of the database files that are included in the image file system. An example catalog command is catalog start with '/mount_point/App/Policy/Client/SID/BackupID/' where mount_point is the mount point directory 460 and /App/Policy/Client/SID/BackupID/ is equivalent to IMGFS_dir discussed above in relation to FIG. 4C, which represents the one or more directories included in the proxy backup image file that have become accessible via IMGFS.

The process continues to operation 530, where the media manager responds to the recovery manager's requests for file attributes by reading file attributes of each file stored in the proxy backup image file. In one embodiment, the media manager forwards file system calls for file attributes from recovery manager to IMGFS, which is further discussed below in relation to FIG. 7. In another embodiment, the media manager issues the file system calls. IMGFS responds to the file system calls by sending the file attributes to the media manager.

The process continues to operation 535, where the media manager provides the file attributes to the recovery manager to add to the recovery catalog. In one embodiment, recovery manager creates a recovery catalog entry for each database file stored in the image file system. The metadata stored in the recovery catalog entries is used by the recovery manager to determine which database files to use in a restore or recovery operation for the target database. In one embodiment, the media manager also notifies the recovery manager once file attributes of all database files have been sent. The process optionally continues to operation 540, where the media manager unmounts the proxy backup image file once the catalog operation is complete. In another embodiment, the media manager may continue to keep the proxy backup image file mounted. The process then ends.

Figure 6:
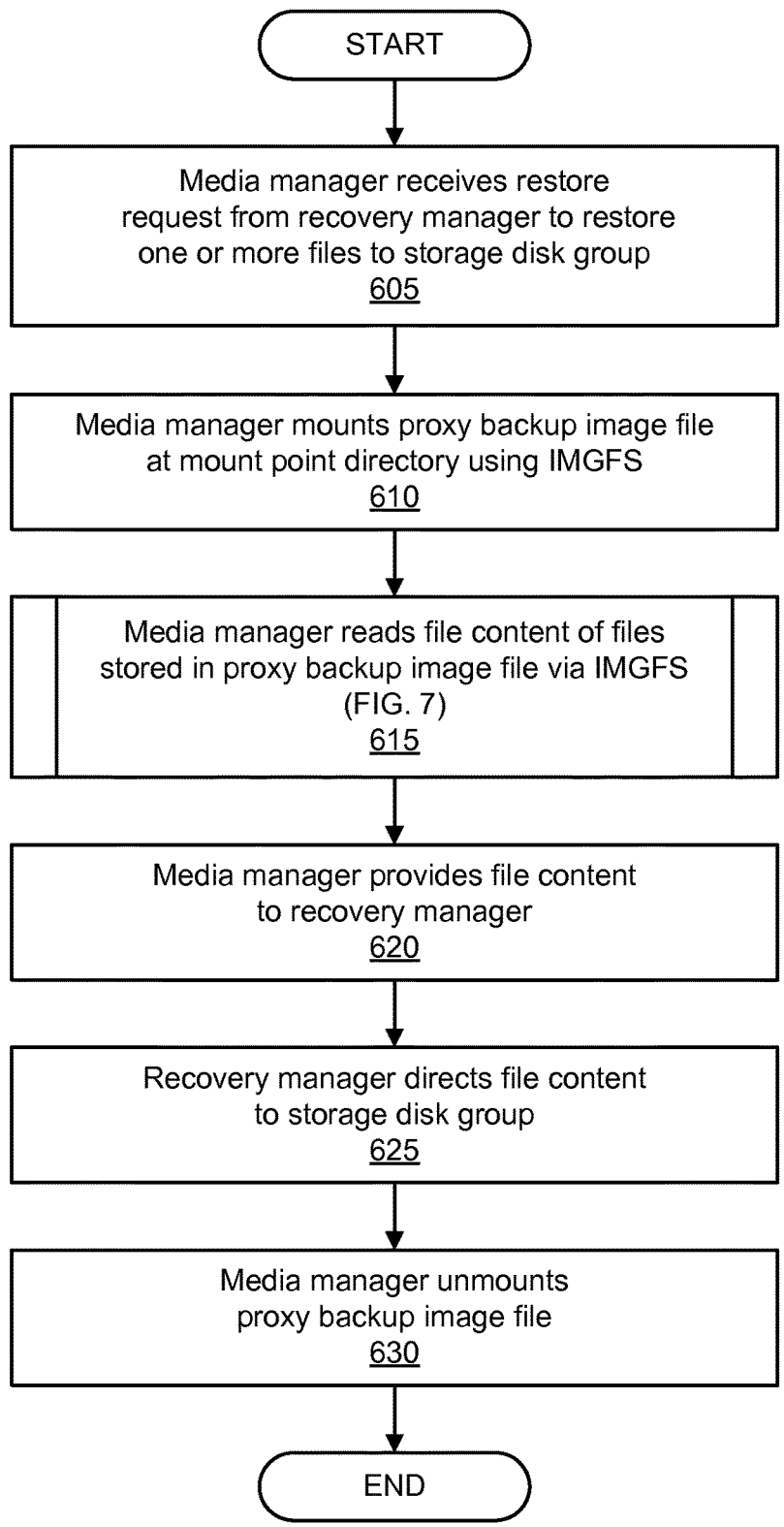
FIG. 6 is a flowchart illustrating an example restore process implemented by a media manager, according to one embodiment.

FIG. 6 is a flowchart illustrating an example restore process implemented by a media manager. The process illustrated in FIG. 6 can be triggered in response to receiving a restore request. The process begins at operation 605, where the media manager receives a restore request from a recovery manager, where the restore request (e.g., a restore command) instructs the media manager to restore one or more particular database files of a target database in proxy mode (e.g., restore the one or more database files from a proxy backup image file). The recovery manager checks the recovery catalog to determine if a suitable proxy backup image file is available. If a proxy backup image file is available, the recovery manager sends the restore request and transfers control of the restore operation to the media manager. If a proxy backup image file is not available, the recovery manager may check whether a suitable stream backup image file is available and send a restore request in stream mode. If neither is available, the recovery manager may indicate that the restore cannot occur and issue an error message. The embodiment described in reference to FIG. 6 presumes that the media manager supports proxy mode and a proxy backup image file is available for restore.

The restore request can also indicate that the destination storage device is a storage disk group managed by a storage manager, where the destination location cannot be determined (indicating that file data should be provided to the recovery manager, which will direct the file data to the destination location via the storage manager). In one embodiment, the recovery manager sends identifiers (e.g., name or file path indicating a location of the database file) of one or more particular database files to be restored from the proxy backup image file. The recovery manager determines which particular database files to restore based on metadata stored in the recovery catalog. In another embodiment, the restore request may request that the entire database be restored. An example restore database command is restore database [until SCN|TIME| . . . ];

where SCN (system change number, further discussed above in relation to FIG. 3A) specifies an upper limit value of the database files' associated SCN (each of which has a unique SCN) that can be used to restore the database, and TIME specifies an upper limit value of the backup files (e.g., proxy backup image files and/or database files stored in a proxy backup image file) that can be used to restore the database (e.g., use backup files that can recover the database to a point one week ago). As will be appreciated, other limitations can be used in addition to or instead of SCN and TIME. The recovery manager can allocate a disk channel to perform the restore (either for the entire database or for one or more database files), since the appropriate backup path (e.g., destination location of the restored files, which is in the storage disk group) is known to the recovery manager internally (e.g., the backup path can be obtained from a control file of the target database). In other words, a tape channel is not used since the media manager does not know the destination location of the restored files. The recovery manager may issue a restore request as part of a recovery operation. While the restore request is performed as described herein, the recovery request is not changed (e.g., the database can still be recovered in proxy mode).

The process continues to operation 610, where the media manager determines which proxy backup image file includes the database files specified in the restore request. The media manager also determines the corresponding mount point directory, which can be obtained from the backup catalog, in one embodiment. In such an embodiment, the media manager mounts the determined proxy backup image file at the corresponding mount point directory using IMGFS. Operation 610 can be skipped if the proxy backup image file is still mounted. In one embodiment, if the mount point directory has not yet been created for the proxy backup image file, operation 610 can also include operations 515-520 of FIG. 5 to create the mount point directory and mount the proxy backup image file, as discussed above. In one embodiment, if the database files included in the proxy backup image file have not yet been cataloged, operation 610 can also include operations 525-540 of FIG. 5 to catalog the files, as discussed above. Operations 610-630 may be repeated for each proxy backup image file that includes one of the specified database files.

The process continues to operation 615, where the media manager responds to the recovery manager's restore request by reading file content of the specified database files from the proxy backup image file, which are visible and accessible via IMGFS. In one embodiment, the media manager requests file content of the specified database files by issuing file system calls (e.g., using open and read) for the file content to IMGFS, which is further discussed below in relation to FIG. 7. IMGFS responds by sending the file content to the media manager.

The process continues to operation 620, where the media manager provides the file content to the recovery manager (since the media manager does not know the destination location in the storage disk group). In an embodiment where the media manager knows the destination location of one or more destination database files (e.g., the database files being restored), the media manager can open each destination database file in the destination file system (e.g., a network file system, the database file system, or other accessible file system in the backup and restore system) and write the file content to the destination database file. In such an embodiment, the media manager would notify the recovery manager when the restore operation is complete (e.g., all file content has been written to the one or more destination database files).

The process continues to operation 625, where the recovery manager (in response to receiving the file content from media manager) directs the file content to the storage disk group. The process optionally continues to operation 630, where media manager unmounts the proxy backup image file once the restore operation is complete. In another embodiment, the media manager may continue to keep the proxy backup image file mounted. The process then ends.

Figures 7A, 7B:
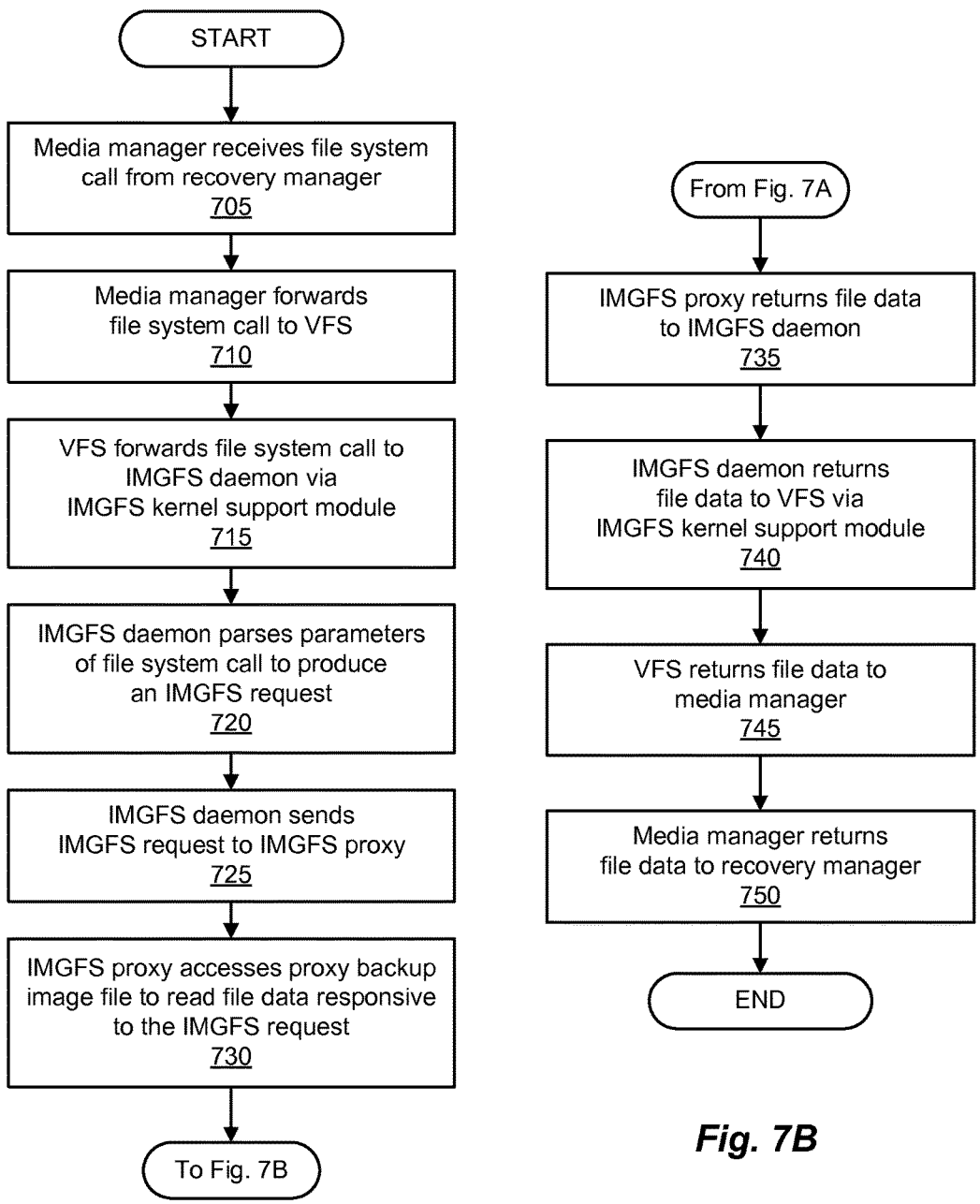
FIGS. 7A and 7B are flowcharts illustrating an example data access process implemented by a virtual image file system proxy and a virtual image file system daemon, according to one embodiment.

FIGS. 7A and 7B are flowcharts illustrating an example data access process implemented by an IMGFS proxy and IMGFS daemon. The process illustrated in FIGS. 7A and 7B can be triggered in response to receiving a file system call. The process begins at operation 705, where the media manager receives a file system call from recovery manager. In another embodiment, media manager issues the file system call. The process continues to operation 710, where the media manager forwards the file system call to VFS. The process continues to operation 715, where VFS locates the file system in which the file referenced in the file system call is stored. In this example, VFS determines that the requested file is stored in the image file system of a proxy backup image file, which is accessible via IMGFS. Thus, VFS forwards the file system call to IMGFS kernel support module, which in turn forwards the file system call to IMGFS daemon.

The process continues to operation 720, where IMGFS daemon parses the parameters of the file system call and produces an IMGFS request that corresponds to the file system call. IMGFS supports a number of file system calls, such as opendir, readdir, closedir, stat, open, read, close. In the embodiment shown, the IMGFS request can be a request for file attributes (as discussed in relation to FIG. 5) or for file content (as discussed in relation to FIG. 6). The process continues to operation 725, where IMGFS daemon sends the IMGFS request to IMGFS proxy. The process continues to operation 730, where IMGFS proxy accesses the proxy backup image file to read file data (e.g., file attributes or file content) responsive to the IMGFS request.

The process continues to operation 735 of FIG. 7B, where IMGFS proxy returns the file data to IMGFS daemon. The process continues to operation 740, where IMGFS daemon returns the file data to IMGFS kernel support module, which returns the file data to VFS. The process continues to operation 745, where VFS returns the file data to the media manager. The process continues to operation 750, where the media manager returns file data to recovery manager. The process then ends.

Figure 8:
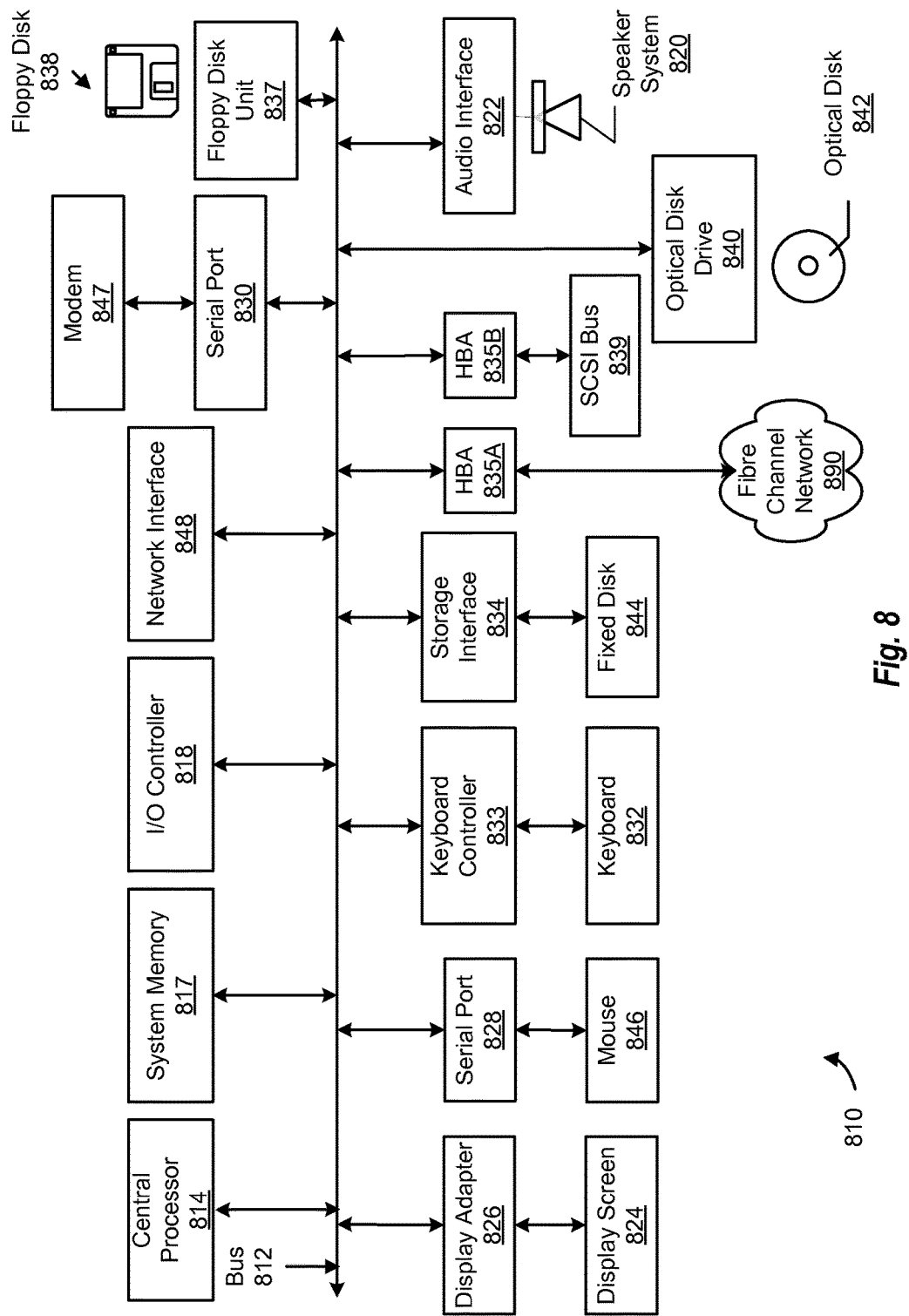
FIG. 8 is a simplified block diagram illustrating components of an example computer system suitable for implementing embodiments of the present disclosure, according to one embodiment.

FIG. 8 is a simplified block diagram that illustrates components of an example computer system 810 that is suitable for implementing the present disclosure. Computer system 810 may be illustrative of various computer systems in backup and restore system 100, such as system(s) that host recovery manager 110, system(s) that host target database 140 and target database instance 120, and/or system(s) that host media manager(s) 150, among others. Computer system 810 includes a bus 812 which interconnects major subsystems of computer system 810, such as a central processor 814, a system memory 817 (typically RAM, but which may also include ROM, flash RAM, or the like), an input/output controller 818, an external audio device, such as a speaker system 820 via an audio output interface 822, an external device, such as a display screen 824 via display adapter 826, serial ports 828 and 830, a keyboard 832 (interfaced with a keyboard controller 833), a storage interface 834, a floppy disk drive 837 operative to receive a floppy disk 838, a host bus adapter (HBA) interface card 835A operative to connect with a Fibre Channel network 890, a host bus adapter (HBA) interface card 835B operative to connect to a SCSI bus 839, and an optical disk drive 840 operative to receive an optical disk 842. Also included are a mouse 846 (or other point-and-click device, coupled to bus 812 via serial port 828), a modem 847 (coupled to bus 812 via serial port 830), and a network interface 848 (coupled directly to bus 812).

Bus 812 allows data communication between central processor 814 and system memory 817, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 810 are generally stored on and accessed via a computer readable medium, such as a hard disk drive (e.g., fixed disk 844), an optical drive (e.g., optical drive 840), a floppy disk unit 837, or other storage medium. Additionally, applications can be in the form of electronic signals modulated in accordance with the application and data communication technology when accessed via network modem 847 or interface 848.

Storage interface 834, as with the other storage interfaces of computer system 810, can connect to a standard computer readable medium for storage and/or retrieval of information, such as a fixed disk drive 844. Fixed disk drive 844 may be a part of computer system 810 or may be separate and accessed through other interface systems. Modem 847 may provide a direct connection to a remote server via a telephone link or to the Internet via an internet service provider (ISP). Network interface 848 may provide a direct connection to a remote server via a direct network link to the Internet via a POP (point of presence). Network interface 848 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 8 need not be present to practice the present disclosure. The devices and subsystems can be interconnected in different ways from that shown in FIG. 8. Code for the automatically performing operations on such applications based on their dependencies on other applications (such as described above with reference to the process of FIG. 5-7), etc., to implement the present disclosure can be stored in computer-readable storage media such as one or more of system memory 817, fixed disk 844, optical disk 842, or floppy disk 838. Memory 817 is also used for storing temporary variables or other intermediate information during the execution of instructions by the processor 814. The operating system provided on computer system 810 may be MS-DOS®, MS-WINDOWS®, OS/2®, UNIX®, Linux®, or another known operating system.

Moreover, regarding the signals described herein, it will be understood that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 9:
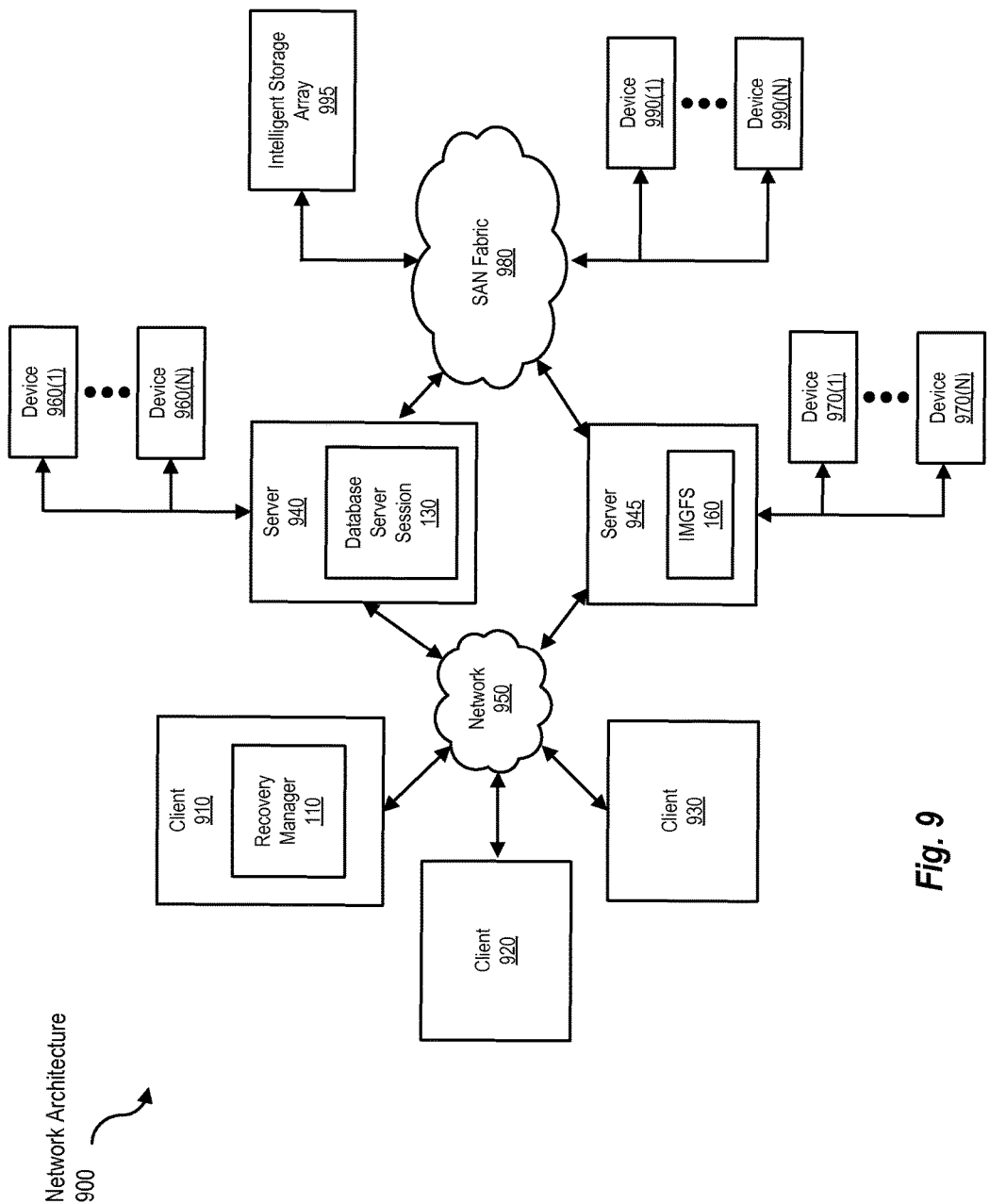
FIG. 9 is a simplified block diagram illustrating components of an example computer system suitable for implementing embodiments of the present disclosure, according to one embodiment.

FIG. 9 is a simplified block diagram illustrating components of an example computer system suitable for implementing embodiments of the present disclosure. FIG. 9 illustrates a network system 900 in which client systems 910, 920 and 930 and servers 940, and 945 can be coupled to a network 950. Client systems 910, 920 and 930 generally represent any type or form of host computing device or system, such as system(s) that host recovery manager 110 in FIG. 1 and/or computer system 810 in FIG. 8, among others.

Similarly, servers 940 and 945 generally represent host computing devices or systems, such as application servers or database servers, configured to provide various database services and/or run certain software applications, such as system(s) that host media manager(s) 150 in FIGS. 2A and 2B, system(s) that host target database 140 and target database instance 120, and/or computer system 810 in FIG. 8, among others. Network 950 generally represents any telecommunication or computer network including, for example, an intranet, a wide area network (WAN), a local area network (LAN), a personal area network (PAN), or the Internet. In one example, server 940 can represent system(s) that host database server session 130 and server 945 can represent system(s) that host an implementation of virtual file system IMGFS 160.

As illustrated in FIG. 9, one or more storage devices 960(1)-(N) can be directly attached to server 940. Similarly, one or more storage devices 970(1)-(N) can be directly attached to server 945. Storage devices 960(1)-(N) and storage devices 970(1)-(N) generally represent any type or form of storage device or medium capable of storing data and/or other computer-readable instructions. In certain embodiments, storage devices 960(1)-(N) and storage devices 970(1)-(N) can represent network-attached storage (NAS) devices configured to communicate with servers 940 and 945 using various protocols, such as Network File System (NFS), Server Message Block (SMB), or Common Internet File System (CIFS). In one example, storage devices 960(1)-(N) can store target database 140 that is accessible via database server session 130, while storage devices 970(1)-(N) can store proxy backup image files that are accessible via IMGFS 160.

Servers 940 and 945 can also be connected to a storage area network (SAN) fabric 980. SAN fabric 980 generally represents any type or form of computer network or architecture capable of facilitating communication between multiple storage devices. SAN fabric 980 can facilitate communication between servers 940 and 945 and a plurality of storage devices 990(1)-(N) and/or an intelligent storage array 995. SAN fabric 980 can also facilitate, via network 950 and servers 940 and 945, communication between client systems 910, 920, and 930 and storage devices 990(1)-(N) and/or intelligent storage array 995 in such a manner that devices 990(1)-(N) and array 995 appear as locally attached devices to client systems 910, 920, and 930. As with storage devices 960(1)-(N) and storage devices 970(1)-(N), storage devices 990(1)-(N) and intelligent storage array 995 generally represent any type or form of storage device or medium capable of storing data and/or other computer-readable instructions.

In certain embodiments, and with reference to computer system 810 of FIG. 8, a communication interface can be used to provide connectivity between each client system 910, 920, and 930 and network 950. Client systems 910, 920 and 930 can be able to access information on server 940 or 945 using, for example, a web browser or other client software. Such software can allow client systems 910, 920 and 930 to access data hosted by server 940, server 945, storage devices 960(1)-(N), storage devices 970(1)-(N), storage devices 990(1)-(N), or intelligent storage array 995. Although FIG. 9 depicts the use of a network (such as the Internet) for exchanging data, the embodiments described and/or illustrated herein are not limited to the Internet or any particular network-based environment.

In at least one embodiment, all or a portion of one or more of the embodiments disclosed herein can be encoded as a computer program and loaded onto and executed by server 940, server 945, storage devices 960(1)-(N), storage devices 970(1)-(N), storage devices 990(1)-(N), intelligent storage array 995, or any combination thereof. All or a portion of one or more of the embodiments disclosed herein can also be encoded as a computer program, stored in and run by server 940 and server 945, and distributed to client systems 910, 920 and 930 over network 950.

In some examples, all or a portion of the computing devices in FIGS. 1, 2A and 2B, 8, and 9 can represent portions of a cloud-computing or network-based environment. Cloud-computing environments can provide various services and applications via the Internet. These cloud-based services (e.g., software as a service, platform as a service, infrastructure as a service, etc.) can be accessible through a web browser or other remote interface. Various functions described herein can be provided through a remote desktop environment or any other cloud-based computing environment.

In addition, one or more of the components described herein can transform data, physical devices, and/or representations of physical devices from one form to another. For example, IMGFS 160 in FIG. 1 can transform information received from a database server session into a proxy backup image file.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method, comprising:
  receiving a restore request from a recovery manager, wherein
    the recovery manager is configured to operate in a stream mode,
    the restore request identifies one or more database files stored in a proxy backup image file created via a proxy backup operation, and the proxy backup image file is stored in a format unsupported by the recovery manager;

mounting the proxy backup image file on a local file system using a virtual file system, wherein the proxy backup image file is mounted at a mount point directory, and the virtual file system implements an interface configured to access the proxy backup image file;

in response to receiving the restore request, accessing the proxy backup image file, wherein the proxy backup image file is accessed via the interface of the virtual file system; and providing file content of each of the one or more database files stored in the proxy backup image file to the recovery manager, in response to the accessing the proxy backup image file, wherein the file content is configured to be used to restore the one or more database files stored in the proxy backup image file to a second storage device.

2. The method of claim 1, further comprising:

providing a notification to the recovery manager, wherein the notification indicates that the recovery manager should catalog the one or more database files; and providing one or more file attributes of each of the one or more database files to the recovery manager, wherein the one or more file attributes of the each of the one or more database files are added to a respective catalog entry that corresponds to each database file.

3. The method of claim 2, further comprising:

reading the one or more file attributes, wherein the virtual file system is configured to read the one or more file attributes from the proxy backup image file.

4. The method of claim 1, further comprising:

receiving a backup request from the recovery manager, wherein the backup request identifies one or more database files of a target database; and generating the proxy backup image file, in response to receipt of the backup request, wherein the proxy backup image file comprises a copy of the one or more database files of the target database.

5. The method of claim 1, wherein the second storage device comprises a group of physical disks, the group of physical disks is managed by a storage manager as a single storage unit, and the storage manager controls file names and locations internally.

6. The method of claim 1, further comprising:

reading file content of the one or more database files.

7. A non-transient computer readable storage medium configured to store program instructions that, when executed on a processor, are configured to cause the processor to perform a method comprising:

receiving a restore request from a recovery manager, wherein the recovery manager is configured to operate in a stream mode, the restore request identifies one or more database files stored in a proxy backup image file created via a proxy backup operation, and the proxy backup image file is stored in a format unsupported by the recovery manager;

mounting the proxy backup image file on a local file system using a virtual file system, wherein the proxy backup image file is mounted at a mount point directory, and the virtual file system implements an interface configured to access the proxy backup image file;

in response to receiving the restore request, accessing the proxy backup image file, wherein the proxy backup image file is accessed via the interface of the virtual file system; and providing file content of each of the one or more database files stored in the proxy backup image file to the recovery manager, in response to the accessing the proxy backup image file, wherein the file content is configured to be used to restore the one or more database files stored in the proxy backup image file to a second storage device.

8. The computer readable storage medium of claim 7, the method further comprising:

providing a notification to the recovery manager, wherein the notification indicates that the recovery manager should catalog the one or more database files; and providing one or more file attributes of each of the one or more database files to the recovery manager, wherein the one or more file attributes of the each of the one or more database files are added to a respective catalog entry that corresponds to each database file.

9. The computer readable storage medium of claim 8, the method further comprising:

reading the one or more file attributes, wherein the virtual file system is configured to read the one or more file attributes from the proxy backup image file.

10. The computer readable storage medium of claim 7, the method further comprising:

receiving a backup request from the recovery manager, wherein the backup request identifies one or more database files of a target database; and generating the proxy backup image file, in response to receipt of the backup request, wherein the proxy backup image file comprises a copy of the one or more database files of the target database.

11. The computer readable storage medium of claim 7, wherein the second storage device comprises a group of physical disks, the group of physical disks is managed by a storage manager as a single storage unit, and the storage manager controls file names and locations internally.

12. The computer readable storage medium of claim 7, the method further comprising:

reading file content of the one or more database files.

13. An apparatus comprising:

a processor; and a memory coupled to the processor and configured to store instructions executable by the processor to implement a media manager configured to:

receive a restore request from a recovery manager, wherein the recovery manager is configured to operate in a stream mode, the restore request is configured to identify one or more database files stored in a proxy backup image file created via a proxy backup operation, and the proxy backup image file is stored in a format unsupported by the recovery manager;

mount the proxy backup image file on a local file system using a virtual file system, wherein
the proxy backup image file is mounted at a mount point directory, and
the virtual file system implements an interface configured to access the proxy backup image file;
in response to receipt of the restore request, access the proxy backup image file, wherein
the proxy backup image file is configured to be accessed via the interface of the virtual file system; and
provide file content of each of the one or more database files stored in the proxy backup image file to the recovery manager, in response to the access of the proxy backup image file, wherein
the file content is configured to be used to restore the one or more database files stored in the proxy backup image file to a second storage device.

14. The apparatus of claim 13, the media manager further configured to:
provide a notification to the recovery manager, wherein
the notification indicates that the recovery manager should catalog the one or more database files; and
provide one or more file attributes of each of the one or more database files to the recovery manager, wherein
the one or more file attributes of the each of the one or more database files are added to a respective catalog entry that corresponds to each database file.

15. The apparatus of claim 14, the media manager further configured to:
read the one or more file attributes, wherein
the virtual file system is configured to read the one or more file attributes from the proxy backup image file, and
the virtual file system is configured to provide the one or more file attributes to the media manager.

16. The apparatus of claim 13, the media manager further configured to:
receive a backup request from the recovery manager, wherein
the backup request identifies one or more database files of a target database; and
generate the proxy backup image file, in response to receipt of the backup request, wherein
the proxy backup image file comprises a copy of the one or more database files of the target database.

17. The apparatus of claim 13, wherein
the second storage device comprises a group of physical disks,
the group of physical disks is managed by a storage manager as a single storage unit, and
the storage manager controls file names and locations internally.

18. The apparatus of claim 13, the media manager further configured to:
read file content of the one or more database files, wherein
the virtual file system is configured to provide the file content to the media manager.

* * * * *